(12) United States Patent
Chung et al.

(10) Patent No.: US 9,340,670 B2
(45) Date of Patent: May 17, 2016

(54) FLAME-RETARDANT POLYCARBONATE RESIN COMPOSITION WITH SCRATCH RESISTANCE

(71) Applicant: Cheil Industries Inc., Gumi-si (KR)

(72) Inventors: Jin Hwa Chung, Uiwang-si (KR); Ja Kwan Koo, Uiwang-si (KR); Joo Hyun Jang, Uiwang-si (KR); Yong Hee Kang, Uiwang-si (KR); Kee Hae Kwon, Uiwang-si (KR); Kwang Soo Park, Uiwang-si (KR); Man Suk Kim, Uiwang-si (KR); Jin Seong Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 15 days.

(21) Appl. No.: 13/914,856

(22) Filed: Jun. 11, 2013

(65) Prior Publication Data

US 2013/0296473 A1 Nov. 7, 2013

Related U.S. Application Data

(63) Continuation-in-part of application No. PCT/KR2010/009539, filed on Dec. 29, 2010.

(30) Foreign Application Priority Data

Dec. 14, 2010 (KR) .......... 10-2010-0127795

(51) Int. Cl.
| | | |
|---|---|---|
| C08L 69/00 | (2006.01) | |
| C08L 33/08 | (2006.01) | |
| C08J 5/00 | (2006.01) | |
| C08L 33/14 | (2006.01) | |

(52) U.S. Cl.
CPC .. C08L 69/00 (2013.01); C08J 5/00 (2013.01); *C08J 2369/00* (2013.01); *C08L 33/14* (2013.01); *C08L 2201/02* (2013.01)

(58) Field of Classification Search
USPC .......................................... 524/502; 525/185
See application file for complete search history.

(56) References Cited

U.S. PATENT DOCUMENTS

| | | | |
|---|---|---|---|
| 3,030,347 A | 4/1962 | O'Brien et al. | |
| 3,210,326 A | 10/1965 | Tousignant et al. | |
| 3,985,831 A | 10/1976 | Boyer | |
| 4,409,350 A | 10/1983 | Fujiwara et al. | |
| 5,278,009 A | 1/1994 | Iida et al. | |
| 5,292,817 A * | 3/1994 | Grey et al. ................. | 525/285 |
| 5,663,019 A | 9/1997 | Matsumura et al. | |
| 5,773,533 A | 6/1998 | Horold | |
| 5,827,626 A | 10/1998 | Kobayashi et al. | |
| 5,876,895 A | 3/1999 | Hishiro et al. | |
| 5,998,091 A | 12/1999 | Suzuki | |
| 6,096,852 A * | 8/2000 | Lensvelt et al. ............ | 528/196 |
| 6,624,250 B2 | 9/2003 | Zimmerman | |
| 6,632,891 B1 | 10/2003 | Tada et al. | |
| 7,763,402 B2 | 7/2010 | Cho et al. | |
| 7,863,382 B2 * | 1/2011 | Ishii et al. ............ | C08L 67/04 |
| | | | 525/186 |
| 8,293,149 B2 | 10/2012 | Lee et al. | |
| 8,486,591 B2 | 7/2013 | Jeong et al. | |
| 8,748,510 B2 * | 6/2014 | Inagaki ................. | C08L 69/00 |
| | | | 523/201 |
| 2002/0172873 A1 | 11/2002 | Ueda et al. | |
| 2007/0145338 A1 | 6/2007 | Zakikhani | |
| 2008/0242795 A1 * | 10/2008 | Jang et al. ................. | 524/547 |
| 2009/0209697 A1 * | 8/2009 | Persigehl et al. ....... | C08L 69/00 |
| | | | 524/502 |
| 2010/0152357 A1 | 6/2010 | Kwon et al. | |
| 2010/0160474 A1 | 6/2010 | Lee et al. | |
| 2010/0168272 A1 | 7/2010 | Park et al. | |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0160400 A1 | 6/2011 | Lee et al. | |
| 2012/0115761 A1 | 5/2012 | Basu | |
| 2013/0001483 A1 | 1/2013 | Lee et al. | |
| 2013/0234084 A1 | 9/2013 | Chung et al. | |

FOREIGN PATENT DOCUMENTS

| | | |
|---|---|---|
| CN | 1121083 A | 4/1996 |
| CN | 101464631 A | 6/2009 |
| CN | 101497630 A | 8/2009 |
| CN | 101747610 A | 6/2010 |
| CN | 101805567 A | 8/2010 |
| EP | 0319971 A2 | 6/1989 |
| EP | 0628599 A1 | 12/1994 |
| EP | 0663410 A1 | 7/1995 |
| EP | 0725315 A2 | 8/1996 |
| EP | 1739109 A1 | 1/2007 |
| EP | 2657292 A1 | 10/2013 |
| JP | 02-70712 A | 3/1990 |
| JP | 07-140654 A | 6/1995 |

(Continued)

OTHER PUBLICATIONS

Office Action in counterpart Korean Application No. 10-2010-0127795 dated Aug. 7, 2013, pp. 1-14.
International Search Report in counterpart International Application No. PCT/KR2010/009539 dated Jan. 18, 2012, pp. 1-6.
Ebdon, et al., "Thermal Degradation and Flame Retardance in Copolymers of Methyl Methacrylate with Diethyl (methacryloyloxymethyl)phosphonate", Polymer Degradation Stab., (2000), vol. 70, pp. 425-436.
Price, D. et al. "Ignition Temperatures and Pyrolysis of a Flame Retardant Methyl Methacrylate Copolymer Containing Diethyl(methacryloxymethyl)phosphonate Units." In: Polym. Int., 2000, vol. 49, pp. 1164-1168.
Office Action in counterpart Chinese Application No. 201080070671.5 dated Mar. 5, 2014, pp. 1-6.

(Continued)

*Primary Examiner* — Peter D Mulcahy
*Assistant Examiner* — Henry Hu
(74) *Attorney, Agent, or Firm* — Additon, Higgins & Pendleton, P.A.

(57) ABSTRACT

The present invention relates to an environmentally friendly flame-retardant polycarbonate resin composition having scratch resistance, which includes a specific (meth)acrylic flame-retardant copolymer to improve flame retardancy and scratch resistance.

9 Claims, No Drawings

(56) References Cited

FOREIGN PATENT DOCUMENTS

| JP | 08-262707 A | 10/1996 |
|---|---|---|
| JP | 10-254133 A | 9/1998 |
| JP | 11-092964 A | 4/1999 |
| JP | 2000-075501 A | 3/2000 |
| JP | 2000-305262 A | 11/2000 |
| JP | 2002-244287 A | 8/2002 |
| JP | 2006-257126 A | 9/2006 |
| JP | 2008-298938 A | 12/2008 |
| JP | 2009-091458 A | 4/2009 |
| KR | 10-1980-0001251 B1 | 10/1980 |
| KR | 10-1992-7002502 | 9/1992 |
| KR | 10-1993-7000858 | 3/1993 |
| KR | 10-1994-0005617 | 6/1994 |
| KR | 10-1995-7000359 | 1/1995 |
| KR | 10-1995-0011163 B1 | 9/1995 |
| KR | 10-1995-7003746 | 9/1995 |
| KR | 10-1996-0029904 | 8/1996 |
| KR | 10-2001-0052338 A * | 6/2001 |
| KR | 10-2006-0111178 | 10/2006 |
| KR | 10-0817563 A1 | 3/2008 |
| KR | 10-0832518 B1 | 5/2008 |
| KR | 10-2008-0089122 A | 10/2008 |
| KR | 10-0885819 B1 | 2/2009 |
| KR | 10-2009-0024561 A | 3/2009 |
| KR | 10-2009-0038191 A | 4/2009 |
| KR | 10-2009-0066204 A | 6/2009 |
| KR | 10-2009-0066242 A | 6/2009 |
| KR | 10-0910829 B1 | 8/2009 |
| KR | 10-2010-0049458 A | 5/2010 |
| KR | 10-2010-0098882 A | 9/2010 |
| KR | 10-2011-0077881 A | 7/2011 |
| KR | 10-2011-0078238 A | 7/2011 |
| TW | 406214 B | 9/2000 |
| TW | 200916955 A | 4/2009 |
| TW | 201030461 A | 8/2010 |
| WO | 99/58593 A1 | 11/1999 |
| WO | WO-99/58593 * | 11/1999 |
| WO | 2008/120854 A | 10/2008 |
| WO | 2009/078593 A1 | 6/2009 |
| WO | 2009/116722 A1 | 9/2009 |
| WO | 2012/015128 A1 | 2/2012 |
| WO | 2012/060514 A1 | 5/2012 |
| WO | 2012/060515 A1 | 5/2012 |
| WO | 2012/081761 A1 | 6/2012 |

OTHER PUBLICATIONS

Notice of Allowance in commonly owned U.S. Appl. No. 13/190,979 mailed on Jun. 19, 2012, pp. 1-10.
Office Action in commonly owned U.S. Appl. No. 13/353,710 mailed on Feb. 1, 2013, pp. 1-24.
Office Action in commonly owned U.S. Appl. No. 13/190,979 mailed on Feb. 16, 2012, pp. 1-10.
UL Ides Properties for PMMA, http://plastics.ides.com/generics/3/c/t/acrylic-acrylic-properties-processing, downloaded on Dec. 19, 2012, pp. 1-4.
Notice of Allowance in commonly owned U.S. Appl. No. 13/353,710 mailed on Aug. 14, 2014, pp. 1-14.
Search Report in commonly owned Chinese Application No. 201210007804.5 dated Dec. 1, 2013, pp. 1-4.
Office Action dated Nov. 22, 2013, in commonly owned Taiwanese Patent Application No. 101103253, pp. 1-3.
Search Report dated Nov. 21, 2013, in commonly owned Taiwanese Patent Application No. 101103253, p. 1.
Canniccioni et al., "Polymerization of a Phosphonated Methacrylate via a Raft Living Radical Polymerization," Polymer Preprints, American Chemical Society, Division of Polymer Chemistry, 2001, 52(2), 645-646.
Office Action in commonly owned U.S. Appl. No. 13/353,710 mailed on Apr. 28, 2014, pp. 1-15.
Notice of Allowance in commonly owned U.S. Appl. No. 13/353,710 mailed on Sep. 5, 2013, pp. 1-12.
Final Office Action in commonly owned U.S. Appl. No. 13/353,710 mailed on May 17, 2013, pp. 1-14.
Office Action in commonly owned U.S. Appl. No. 12/966,133 mailed on Jan. 3, 2013, pp. 1-20.
Final Office Action in commonly owned U.S. Appl. No. 12/966,133 mailed on Jun. 28, 2013, pp. 1-23.
Extended European Search Report in commonly owned European Application No. 10855400 dated Nov. 15, 2013, pp. 1-6.
International Search Report in commonly owned International Application No. PCT/KR2010/009538 dated Sep. 16, 2011, pp. 1-4.
Price et al., "Flame retarding poly(methyl methacrylate) with phosphorous-containing compounds: comparison of an additive with a reactive approach", Polymer Degradation and Stability, 2001, vol. 74, pp. 441-447.
Notice of Allowance in commonly owned U.S. Appl. No. 13/872,240 mailed Aug. 20, 2014, pp. 1-9.
Korean Office Action in commonly owned Korean Application No. 10-2010-0109991 dated Apr. 12, 2013, pp. 1-6.
International Search Report in commonly owned International Application No. PCT/KR2010/009532 dated Dec. 19, 2011, pp. 1-2.
Korean Office Action in commonly owned Korean Application No. 10-2010-0109988 dated Jun. 19, 2013, pp. 1-5.
Chinese Office Action in commonly owned Chinese Application No. 201080070004.7 dated Feb. 19, 2014, pp. 1-7.
English-translation of Chinese Office Action in commonly owned Chinese Application No. 201080070004.7 dated Feb. 19, 2014, pp. 1-7.
Hong et al., "Preparation and Properties of Flame Retardant Acrylate Rubber," China Synthetic Rubber Industry, vol. 23, No. 02, pp. 92-94.
Jin et al., "Polyacrylates Flame Retardants," Chinese Journal of Colloid & polymer, vol. 19, No. 4, pp. 41-43, 2001.
International Search Report in commonly owned International Application No. PCT/KR2010/009533 dated Dec. 19, 2011, pp. 1-2.
Office Action in commonly owned U.S. Appl. No. 13/872,240 mailed Feb. 24, 2014, pp. 1-8.
Price et al., "Flame retardance of poly(methyl methacrylate) modified with phosphorus-containing compounds", Polymer Degradation and Stability, vol. 77, (2002) pp. 227-233.
Office Action in commonly owned U.S. Appl. No. 13/740,335 mailed Sep. 18, 2014, pp. 1-20.
Office Action in commonly owned U.S. Appl. No. 13/740,335 mailed Jan. 7, 2015, pp. 1-12.
Office Action in commonly owned U.S. Appl. No. 13/872,230 mailed Dec. 18, 2014, pp. 1-10.

* cited by examiner

FLAME-RETARDANT POLYCARBONATE RESIN COMPOSITION WITH SCRATCH RESISTANCE

CROSS-REFERENCE TO RELATED APPLICATIONS

This application is a continuation-in-part of International Application No. PCT/KR2010/009539 filed Dec. 29, 2010, pending, which designates the U.S., published as WO 2012/081761 and is incorporated herein by reference in its entirety, and claims priority therefrom under 35 USC Section 120. This application also claims priority under 35 USC Section 119 to and the benefit of Korean Patent Application No. 10-2010-0127795, filed Dec. 14, 2010, the entire disclosure of which is incorporated herein by reference.

FIELD OF THE INVENTION

The present invention relates to a flame-retardant and scratch-resistant polycarbonate resin composition.

BACKGROUND

Thermoplastic resins can exhibit excellent physical properties such as low specific gravity, good moldability and good impact resistance, as compared with glass or metal. Recently, with the trend of low cost, larger and light electronics, plastic products made of thermoplastic resins are quickly replacing existing glass or metal-based products, thereby broadening applications thereof from electronics to automobile components. In line with this trend, functions as exterior materials and external appearance become increasingly important, and development of resins having good scratch resistance for ensuring stability from exterior shock or scratch, or flame retardancy for ensuring stability against fire is highly demanded.

Acrylic resins, specifically poly(methyl methacrylate) resins, have excellent transparency, weather resistance, mechanical strength, surface gloss, adhesion, and the like, particularly remarkably excellent scratch resistance. However, acrylic resins have poor impact resistance and flame retardancy.

In order to overcome these problems while achieving mechanical properties including scratch resistance, one method is to mix a polycarbonate (PC) and an acrylic resin, for example poly(methyl methacrylate) (PMMA), to prepare PC/PMMA resins. In order to prepare PC/PMMA resins having high compatibility, acrylic copolymers having a high index of refraction are used, thereby developing an alloy resin of polycarbonate and acrylic resins having high scratch resistance. However, the alloy resin exhibits low flame retardancy due to a low content of a flame retardant and is likely to suffer from deterioration in mechanical properties including heat resistance when containing a flame retardant. Furthermore, when preparing a resin by adding phosphorus monomer-based flame retardant, the flame retardant can easily migrate from the resin, thereby causing environmental contamination.

In order to overcome these problems, there is an increasing need for polycarbonate resin compositions including a copolymerizable phosphorus-based acrylic monomer.

SUMMARY OF THE INVENTION

The present invention provides an environmentally friendly flame-retardant and scratch-resistant polycarbonate resin composition.

The present invention further provides a polycarbonate resin composition that can have both flame retardancy and excellent scratch resistance.

The present invention further provides a polycarbonate resin composition including a flame retardant acrylic copolymer which can enhance both flame retardancy and scratch resistance with polycarbonate.

The present invention further provides a molded article prepared from the polycarbonate resin composition.

The polycarbonate resin composition may include: (A) a polycarbonate resin; and (B) a (meth)acrylic flame retardant copolymer.

In one embodiment, the (B) (meth)acrylic flame retardant copolymer may include (b1) a phosphorus-based acrylic monomer represented by Formula 1; (b2) an aromatic and/or a cycloaliphatic (meth)acrylate represented by Formula 2 and/or 3, or a combination thereof; and (b3) a reactive unsaturated monomer:

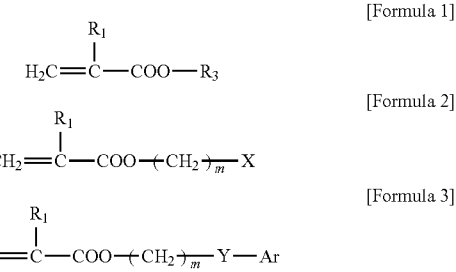

In one embodiment, the (B) (meth)acrylic flame retardant copolymer may include about 1 wt % (% by weight) to about 50 wt % of the (b1) phosphorus-based acrylic monomer, about 1 wt % to about 99 wt % of the (b2) aromatic and/or cycloaliphatic (meth)acrylate, and 0 wt % to about 98 wt % of the (b3) reactive unsaturated monomer.

In one embodiment, the (B) (meth)acrylic flame retardant copolymer may be present in an amount of about 1 part by weight to about 50 parts by weight based on about 100 parts by weight of the polycarbonate resin composition.

In one embodiment, the polycarbonate resin composition may have flame retardancy of V2 or more as measured on a 3.2 mm thick specimen in accordance with UL94 vertical test method.

In one embodiment, the polycarbonate resin composition may have a scratch resistance width from about 200 μm to about 340 μm, as measured on a 2.5 mm thick specimen in accordance with a Ball-type Scratch Profile (BSP) test.

A molded article prepared from the polycarbonate resin composition is also provided.

The present invention provides an environmentally friendly flame-retardant and scratch-resistant polycarbonate resin composition. In addition, the present invention provides a polycarbonate resin composition that can have flame retardancy together with excellent scratch resistance. Furthermore, the present invention provides a polycarbonate resin composition including a flame retardant acrylic copolymer for enhancing both flame retardancy and scratch resistance with polycarbonate.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a polycarbonate resin composition may have a flame retardancy of V2 or more. A method for measuring flame retardancy is not particularly limited. For example, the polycarbonate resin composition may have a flame retardancy of V2 or more, as measured on a 3.2 mm thick specimen in accordance with UL94 vertical test method.

In addition, the polycarbonate resin composition may have a scratch resistance width from about 200 μm to about 340 μm. A method for measuring the scratch resistance width is not particularly limited. For example, the polycarbonate resin composition may have a scratch resistance width from about 200 μm to about 340 μm as measured on a 2.5 mm thick specimen in accordance with a Ball-type Scratch Profile (BSP) test.

Furthermore, the polycarbonate resin composition may have a degree of heat resistance of about 120° C. or more. A method for measuring the degree of heat resistance is not particularly limited. For example, the polycarbonate resin composition may have a degree of heat resistance (Vicat Softening Temperature: VST) of about 120° C. or more, as measured on a 3.2 mm thick specimen under a load of 5 kg in accordance with ASTM D1525.

The polycarbonate resin composition of the present invention may include (A) a polycarbonate resin; and (B) a (meth)acrylic flame retardant copolymer.

(A) Polycarbonate Resin

Examples of the polycarbonate resin may include without limitation linear polycarbonate resins, branched polycarbonate resins, polyester carbonate copolymer resins, and the like, and combinations thereof.

The linear polycarbonate resins may be prepared by a typical method, in which a phenol compound, for example a dihydric phenol compound, may be reacted with phosgene in the presence of a molecular weight modifying agent and a catalyst. In addition, the linear polycarbonate resins may include resins prepared through transesterification of a phenol compound, for example a dihydric phenol compound, and a carbonate precursor, for example diphenyl carbonate.

The branched polycarbonate resins may be prepared by reacting a polyfunctional aromatic compound, such as trimellitic anhydride, trimellitic acid, and the like, with a dihydric phenol compound and a carbonate precursor, without being limited thereto.

The polyester carbonate copolymer resins may be prepared by reacting a difunctional carboxylic acid with a dihydric phenol compound and a carbonate precursor, without being limited thereto.

The dihydric phenol compound may include bisphenol compounds. For example, the dihydric phenol compound may be 2,2-bis(4-hydroxyphenyl)propane (bisphenol A). The bisphenol A may be partially or completely replaced by a different type of dihydric phenol compound.

Examples of different types of dihydric phenol compounds may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis (4-hydroxyphenyl)ketone, bis(4-hydroxyphenyl)ether, halogenated bisphenol, for example 2,2-bis(3,5-dibromo-4-hydroxyphenyl)propane, and the like, and combinations thereof.

In addition, the polycarbonate resin may be a homopolymer including a dihydric phenol compound, a copolymer including two or more dihydric phenol compounds, or a mixture thereof.

The polycarbonate resin composition may include the polycarbonate resin in an amount of about 50 parts by weight to about 99 parts by weight, for example about 60 parts by weight to about 95 parts by weight, and as another example about 70 parts by weight to about 95 parts by weight, based on about 100 parts by weight of the polycarbonate resin composition. In some embodiments, the polycarbonate resin composition may include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 parts by weight. Further, according to some embodiments of the present invention, the amount of the polycarbonate resin can be in a range from about any of the foregoing amounts to about any other of the foregoing amounts.

When the polycarbonate resin composition includes the polycarbonate resin in an amount within this range, when two resins are blended, there may be minimal or no reduction in compatibility, and thus minimal or no reduction in transparency and impact resistance while improving scratch resistance.

(B) (Meth)Acrylic Flame Retardant Copolymer

The (meth)acrylic flame retardant copolymer may be a copolymer prepared by polymerizing (b1) a phosphorus-based acrylic monomer represented by Formula 1; (b2) an aromatic and/or a cycloaliphatic (meth)acrylate represented by Formula 2 and/or 3, or a combination thereof; and (b3) a reactive unsaturated monomer:

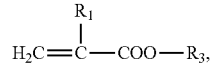

[Formula 1]

wherein $R_1$ is —H or —$(CH_2)_n$—$CH_3$, n is an integer from 0 to 5, and $R_3$ is

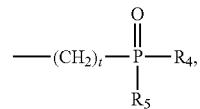

wherein t is an integer from 1 to 10, $R_4$ and $R_5$ are the same or different and are each independently —$O(CH_2)_q X$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl.

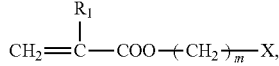

[Formula 2]

wherein $R_1$ is —H or —$(CH_2)_n$—$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl.

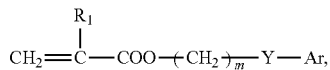

[Formula 3]

wherein $R_1$ is —H or —$(CH_2)_n$—$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

The (b1) phosphorus-based acrylic monomer may have an index of refraction of about 1.4000 to about 1.6000.

The (meth)acrylic copolymer may include the (b1) phosphorus-based acrylic monomer in an amount of about 1 wt % or more, for example about 1 wt % to about 50 wt %, and as another example about 1 wt % to about 40 wt %, based on the total weight of the (meth)acrylic flame retardant copolymer. In some embodiments, the (meth)acrylic copolymer may include the (b1) phosphorus-based acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the (b1) phosphorus-based acrylic monomer can be in a range from about any of the foregoing amounts to about any other of the foregoing amounts.

When the (meth)acrylic copolymer includes the (b1) phosphorus-based acrylic monomer in an amount within this range, the resin composition can exhibit excellent flame retardancy and scratch resistance.

Examples of the (b1) phosphorus-based acrylic monomer may include without limitation dimethyl(methacryloyloxymethyl)phosphonate, dimethyl(acryloyloxymethyl)phosphonate, methylethyl(methacryloyloxymethyl)phosphonate, methylethyl(acryloyloxymethyl)phosphonate, dimethyl(methacryloyloxyethyl)phosphonate, diethyl(methacryloyloxymethyl)phosphonate, diethyl(acryloyloxymethyl)phosphonate, diethyl(methacryloyloxyethyl)phosphonate, dipropyl(methacryloyloxymethyl)phosphonate, dipropyl(methacryloyloxyethyl)phosphonate, and the like, and combinations thereof.

The (b2) aromatic and/or cycloaliphatic (meth)acrylate may have an index of refraction of about 1.4950 to about 1.6500, for example about 1.4950 to about 1.590. Within this range, the acrylic copolymer resin can have an increased index of refraction, which can help improve compatibility with the polycarbonate resin, which typically has a high index of refraction.

The (b2) aromatic and/or cycloaliphatic (meth)acrylate may have a weight average molecular weight from about 3,000 g/mol to about 50,000 g/mol.

Examples of the (b2) aromatic and/or cycloaliphatic (meth)acrylate may include without limitation cyclohexyl (meth)acrylate, phenoxy (meth)acrylate, 2-ethylphenoxy (meth)acrylate, benzyl (meth)acrylate, phenyl (meth)acrylate, 2-ethylthiophenyl (meth)acrylate, 2-phenylethyl (meth)acrylate, 2-phenylpropyl (meth)acrylate, 3-phenylpropyl (meth)acrylate, 4-phenylbutyl (meth)acrylate, 2-(2-methylphenyl)ethyl (meth)acrylate, 2-(3-methylphenyl)ethyl (meth)acrylate, 2-(4-methylphenyl)ethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, 2-(4-benzylphenyl)ethyl (meth)acrylate, and the like and combinations thereof.

In some embodiments, the (meth)acrylic copolymer may include the (b2) aromatic and/or cycloaliphatic (meth)acrylate in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the (b2) aromatic and/or cycloaliphatic (meth)acrylate can be in a range from about any of the foregoing amounts to about any other of the foregoing amounts.

The (b3) reactive unsaturated monomer may be a monofunctional unsaturated monomer, without being limited thereto. Examples of the reactive unsaturated monomer may include without limitation acrylic esters, methacrylic esters, unsaturated carboxylic acids, unsaturated carboxylic acid anhydrides, acid anhydrides, unsaturated carboxylic acid esters having hydroxyl groups, unsaturated carboxylic acid amides, and the like, and combinations thereof. Examples of the reactive unsaturated monomer may include without limitation acrylic esters including methyl acrylate, ethyl acrylate, propyl acrylate, butyl acrylate, 2-ethylhexyl acrylate, and the like; methacrylic esters including methyl methacrylate, ethyl methacrylate, propyl methacrylate, butyl methacrylate, benzyl methacrylate, and the like; unsaturated carboxylic acids including acrylic acid, and methacrylic acid, and the like; unsaturated carboxylic acid anhydrides including maleic anhydride, and the like; unsaturated carboxylic acid esters having hydroxyl groups including 2-hydroxyethyl acrylate, 2-hydroxypropyl acrylate, monoglycerol acrylate, and the like; unsaturated carboxylic acid amides including acrylic amide, methacrylic amide, and the like; and the like, and combinations thereof.

In some embodiments, the (meth)acrylic copolymer may include the (b3) reactive unsaturated monomer in an amount of 0 (the (b3) reactive unsaturated monomer is not present) about 0 (the (b3) reactive unsaturated monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt %. Further, according to some embodiments of the present invention, the amount of the (b3) reactive unsaturated monomer can be in a range from about any of the foregoing amounts to about any other of the foregoing amounts.

The (meth)acrylic flame retardant copolymer may be a copolymer prepared by polymerizing about 1 wt % to about 50 wt % of the phosphorus-based acrylic monomer, about 1 wt % to about 99 wt % of the aromatic and/or cycloaliphatic (meth)acrylate, and about 0 wt % to about 98 wt % of the reactive unsaturated monomer. For example, the (meth)acrylic flame retardant copolymer may be a copolymer prepared by copolymerizing about 1 wt % to about 50 wt % of the phosphorus-based acrylic monomer, about 5 wt % to about 89 wt % of the aromatic and/or cycloaliphatic (meth)acrylate, and about 10 wt % to about 94 wt % of the reactive unsaturated monomer. In other embodiments, the (meth)acrylic flame retardant copolymer may be a copolymer prepared by copolymerizing about 1 wt % to about 40 wt % of the phosphorus-based acrylic monomer, about 10 wt % to 7 about 9 wt % of the aromatic and/or cycloaliphatic (meth)acrylate, and about 20 wt % to about 89 wt % of the reactive unsaturated monomer. In other embodiments, the (meth)acrylic flame retardant copolymer may be a copolymer prepared by copolymerizing about 5 wt % to about 50 wt % of the phosphorus-based acrylic monomer, about 15 wt % to about 40 wt % of the aromatic and/or cycloaliphatic (meth)acrylate, and about 10 wt % to about 80 wt % of the reactive unsaturated monomer.

The (meth)acrylic flame retardant copolymer may have a weight average molecular weight ranging from about 5,000 g/mol to about 500,000 g/mol, for example about 5,000 g/mol to about 150,000 g/mol. Within this range, the resin composition can maintain flame retardancy and can have improved scratch resistance while maintaining flowability and transparency.

The (meth)acrylic flame retardant copolymer may have an index of refraction of about 1.490 to about 1.590.

The polycarbonate resin composition may include the (meth)acrylic flame retardant copolymer in an amount of about 1 part by weight to about 50 parts by weight, for example about 5 parts by weight to about 40 parts by weight, and as another example about 5 parts by weight to about 30 parts by weight, based on about 100 parts by weight of the polycarbonate resin composition. In some embodiments, the polycarbonate resin composition may include the (meth)acrylic flame retardant copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the (meth)acrylic flame retardant copolymer can be in a range from about any of the foregoing amounts to about any other of the foregoing amounts.

When the polycarbonate resin composition includes the (meth)acrylic flame retardant copolymer in an amount within this range, the resin composition can have improved flame retardancy and can prevent significant reduction in impact resistance and mechanical properties.

The (meth)acrylic flame retardant copolymer may be prepared by typical bulk polymerization, emulsion polymerization, or suspension polymerization, without being limited thereto. In exemplary embodiments, the (meth)acrylic flame retardant copolymer may be prepared by suspension polymerization. The temperature and duration of polymerization may be suitably adjusted. For example, polymerization may be performed at a temperature of about 65° C. to about 125° C., for example about 70° C. to about 120° C., for about 2 to about 8 hours.

The method of preparing a (meth)acrylic flame retardant copolymer may include polymerizing a monomer mixture including a phosphorus-based acrylic monomer, an aromatic and/or cycloaliphatic (meth)acrylate, and a reactive unsaturated monomer.

Polymerization may be carried out in the presence of a polymerization initiator and a chain transfer agent.

The polymerization initiator may be any polymerization initiator known in the art. Examples of the polymerization initiator may include without limitation octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, azobis-(2,4-dimethyl)-valeronitrile, and the like, and combinations thereof. The polymerization initiator may be present in an amount of about 0.01 parts by weight to about 10 parts by weight based on about 100 parts by weight of the monomer mixture.

The chain transfer agent may be used to adjust the weight average molecular weight and improve heat stability of the (meth)acrylic flame retardant copolymer. The weight average molecular weight may be adjusted by the amount of the polymerization initiator included in the monomer mixture. However, when the polymerization reaction is stopped by the chain transfer agent, the end of the chain may have a second carbon structure. This allows the chain end to have stronger binding strength than that of the chain end having double bonds formed when a chain transfer agent is not employed. Accordingly, the addition of the chain transfer agent can improve heat stability, thereby enhancing light properties of the flame retardant acrylic copolymer.

The chain transfer agent may be any typical chain transfer agent known in the art. Examples of the chain transfer agent may include without limitation alkyl mercaptans represented by $CH_3(CH_2)_nSH$ (wherein n is an integer from 1 to 20) including n-butyl mercaptan, n-octyl mercaptan, n-dodecyl mercaptan, tert-dodecyl mercaptan, isopropyl mercaptan, n-amyl mercaptan, and the like; halogen compounds including carbon tetrachloride and the like; aromatic compounds including alpha methylstyrene dimer or alpha ethylstyrene dimer and the like, and combinations thereof.

The chain transfer agent may be present in an amount of about 0.02 parts by weight to about 10 parts by weight based on about 100 parts by weight of the monomer mixture. When the amount of the chain transfer agent is less than about 0.02 parts by weight, the copolymer can be deteriorated in heat resistance due to thermal degradation. When the amount of the chain transfer agent is greater than about 10 parts by weight, the copolymer can be reduced in weight average molecular weight, thereby deteriorating mechanical properties.

The monomer mixture may further include at least one or more additives. Examples of the additives may include without limitation suspension stabilizers, suspension stabilization aids, flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, and combinations thereof. The additives may be present in an amount of about 0.001 parts by weight to about 20 parts by weight based on about 100 parts by weight of the monomer mixture, without being limited thereto.

Examples of the suspension stabilizers may include without limitation organic suspension stabilizers including polyalkylacrylate-acrylic acids, polyolefin-maleic acid, polyvinyl alcohol, cellulose, and the like; inorganic suspension stabilizers including tricalcium phosphate and the like; and mixtures thereof.

Examples of the suspension stabilization aids may include without limitation disodium hydrogen phosphate, sodium dihydrogen phosphate, and the like, and combinations thereof. Sodium sulfate and the like may be added in order to control solubility of water soluble polymers or monomers.

Examples of the antioxidants may include without limitation octadecyl 3-(3,5-di-tert-butyl-4-hydroxyphenyl)propionate, triethylene glycol-bis-3 (3-tert-butyl-4-hydroxy-5-methylphenyl)propionate, 2,6-di-tert-butyl-4-methyl phenol, 2,2'-methylenebis(4-methyl-6-tert-butylphenol), tris(2,4-di-tert-butylphenyl)phosphite, n-octadecyl-3-(3,5-di-tert-butyl-4-hydroxyphenyl)propionate, 1,3,5-tri(3,5-di-tert-butyl-4- hydroxybenzyl)isocyanurate, 3-(3,5-di-tert-butyl-4-hydroxyphenyl)propionate, distearyl thio dipropionate, di lauryl thio dipropionate, di-phenyl-isooctyl phosphite, and the like, and combinations thereof.

After completing polymerization, the resulting copolymer may be subjected to cooling, washing, dehydration, and drying procedures to obtain a copolymer in the form of pellets. The obtained copolymer may be pelletized through extrusion. Extrusion may be carried out by any typical method known in the art. In addition, in extrusion, at least one additive selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents and combinations thereof may be added to the flame retardant acrylic copolymer and then subjected to extrusion.

The resin composition of the present invention may further include at least one or more additives selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and mixtures thereof.

The resin composition of the present invention may be prepared by any method known in the art. For example, the components of the present invention and other additives can be mixed simultaneously, subjected to melt extrusion in an extruder to yield pellets and then the resulting pellets can be molded to form injection and compression molded articles.

The present invention provides a molded article prepared from the polycarbonate resin composition. Examples of molding methods include extrusion, injection molding or casting and the like, without being limited thereto. These molding methods are well known to those skilled in the art.

The molded articles may be broadly applied as exterior materials of various electric and electronic components, parts and automobile components, lenses, window glass and the like. For example, examples of the molded articles may include housings for electric or electronic home appliances, such as televisions, stereo systems, washing machines, cassette players, MP3 players, telephones, game consoles, video players, computers, photocopiers, and the like, and interior/exterior materials of automobiles, such as dashboards of automobiles, instrument panels, door panels, quarter panels, wheel covers, and the like.

Next, the present invention will be better appreciated from the following examples and comparative examples. It should be understood that these examples are provided for illustration only and are not to be construed in any way as limiting the scope of the present invention.

Descriptions of details apparent to those skilled in the art will be omitted. The specifications of components used in Examples and Comparative Examples are as follows.

(A) Polycarbonate Resin

PANLITE L-1250WP which has a weight average molecular weight of 25,000 g/mol and is a bisphenol A linear polycarbonate resin produced by TEIJIN in Japan is used as a polycarbonate resin.

(B) (Meth)Acrylic Flame Retardant Copolymer (B1) (Meth)Acrylic Flame Retardant Copolymer-1

A copolymer (weight average molecular weight 25,000 g/mol) prepared by suspension polymerizing 5 wt % of diethyl (methacryloyloxymethyl)phosphonate, 30 wt % of benzyl methacrylate monomer having an index of refraction of 1.568 and 65 wt % of methyl methacrylate monomer is used.

(B2) (Meth)Acrylic Flame Retardant Copolymer-2

A copolymer (weight average molecular weight 45,000 g/mol) prepared by suspension polymerizing 5 wt % of diethyl (methacryloyloxymethyl)phosphonate, 30 wt % of benzyl methacrylate monomer having an index of refraction of 1.568 and 65 wt % of methyl methacrylate monomer is used.

(B3) (Meth)Acrylic Flame Retardant Copolymer-3

A copolymer (weight average molecular weight 25,000 g/mol) prepared by suspension polymerizing 10 wt % of diethyl (methacryloyloxymethyl)phosphonate, 30 wt % of phenyl methacrylate monomer having an index of refraction of 1.568 and 60 wt % of methyl methacrylate monomer is used.

(B4) (Meth)Acrylic Flame Retardant Copolymer-4

A copolymer (weight average molecular weight 25,000 g/mol) prepared by suspension polymerizing 5 wt % of diethyl (methacryloyloxymethyl)phosphonate, 30 wt % of phenyl methacrylate monomer having an index of refraction of 1.570 and 65 wt % of methyl methacrylate monomer is used.

(B5) (Meth)Acrylic Flame Retardant Copolymer-5

A copolymer (weight average molecular weight 45,000 g/mol) prepared by suspension polymerizing 5 wt % of diethyl (methacryloyloxymethyl)phosphonate, 30 wt % of phenyl methacrylate monomer having an index of refraction of 1.570 and 65 wt % of methyl methacrylate monomer is used.

(B6) (Meth)Acrylic Flame Retardant Copolymer-6

A copolymer (weight average molecular weight 120,000 g/mol) prepared by suspension polymerizing 5 wt % of diethyl (methacryloyloxymethyl)phosphonate, 30 wt % of phenyl methacrylate monomer having an index of refraction of 1.570 and 65 wt % of methyl methacrylate monomer is used.

(B7) (Meth)Acrylic Flame Retardant Copolymer-7

A copolymer (weight average molecular weight 25,000 g/mol) prepared by suspension polymerizing 10 wt % of diethyl (methacryloyloxymethyl)phosphonate, 30 wt % of phenyl methacrylate monomer having an index of refraction of 1.570 and 60 wt % of methyl methacrylate monomer is used.

(C) Acrylic Resin Having High Index of Refraction

A copolymer (weight average molecular weight 55,000 g/mol) prepared by suspension polymerizing 30 wt % of phenyl methacrylate monomer having an index of refraction of 1.570 and 70 wt % of methyl methacrylate monomer is used.

(D) Acrylic Resin

L84 (weight average molecular weight 92,000 g/mol), a poly(methyl methacrylate) resin prepared by LG MMA, is used.

Examples 1-9 and Comparative Examples 1-4

The components are mixed in an amount as listed in Table 1. To the mixture, 0.1 parts by weight of a heat stabilizer IRGANOX-1076 (CIBA HOLDING AG) is added based on 100 parts by weight of the resin composition, followed by melting, kneading, and extrusion to yield pellets. A twin-screw extruder having a diameter of 45 mm and L/D=28 is used for extrusion. The prepared pellets are dried at 80° C. for 6 hours and injection-molded in a 6 oz injection molding machine to prepare specimens.

Experimental Examples

Measurement of Physical Properties of the Specimens

Flow mark, transparency, total light transmittance (TT), heat resistance, flow index (MI), flame retardancy and scratch resistance of the specimens prepared in the examples and the comparative examples are evaluated as follows. Results are shown in Table 1.

<Evaluation Method of Physical Properties>

1. Flow mark: The presence of flow mark is evaluated using specimens having a size of L90 mm×W50 mm×t2.5 mm with the naked eye. Flow mark is a way to evaluate compatibility of the composition.

2. Transparency and Color: The specimens are evaluated as to whether the specimens are transparent, translucent or opaque with the naked eye.

3. Total light transmittance (TT) (%): Haze and total light transmittance (TT) of each 2.5 mm thick specimen are measured using a hazemeter NDH 2000 (Nippon Denshoku Co. Ltd.) in accordance with ASTM D1003. The total light transmittance is calculated from the total sum of diffused light transmittance (DF) and parallel light transmittance (PT). A higher total light transmittance (TT) is evaluated as higher transparency.

$$\text{Haze value (\%)} = \frac{\text{Diffused light transmittance }(DF)}{\text{Parallel light transmittance }(PT)}$$

4. Heat resistance (° C.): Vicat softening temperature (VST) is measured under a load of 5 kg in accordance with ASTM D1525.

5. Flame retardancy: Flame retardancy is measured on a 3.2 mm thick specimen in accordance with UL 94 vertical test and evaluated as V1, V2 or fail.

6. Scratch resistance (BSP width, μm): Scratch resistance is measured on a 2.5 mm thick specimen in accordance with a Ball-type Scratch Profile (BSP) test.

The BSP test is conducted by applying a 10 to 20 mm long scratch to a surface of a resin specimen under certain load and speed, and measuring a profile of the applied scratch through a surface profile analyzer. The scratch resistance is evaluated from scratch width, scratch depth, scratch range, and scratch area. The surface profile analyzer measuring the scratch profile may be of a contact type or a non-contact type. In the case of the contact type, the surface profile analyzer may provide a scratch profile through surface scanning using a metal stylus tip having a diameter of 1~2 μm. In the case of the non-contact type, the surface profile analyzer may include optical spectrometers such as a three-dimensional microscope and AFM. Scratch width (μm), scratch depth, scratch range, and scratch area, which are measures of scratch resistance, are determined from the measured scratch profile. As the measured scratch width, scratch depth and scratch range, and scratch area decrease, scratch resistance increases. The scratch width, scratch depth and scratch range are represented in μm and the scratch area is represented in $\mu m^2$. In the present BSP test, a contact type surface profile analyzer (XP-1) from Ambios Corporation is used wherein the tip of a metal stylus has a diameter of 2 μm. The load applied upon measuring the scratch resistance is 1,000 g, the scratch speed is 75 mm/min, and the metal tip causing a scratch is a metal spherical tip having a diameter of 0.7 mm. Scratch width (μm) is measured using a specimen having a size of L90 mm×W50 mm×t2.5 mm.

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| (A) | 80 | 70 | 70 | 80 | 70 | 70 | 70 | 70 | 70 | 80 | 70 | 70 | 100 |
| (B1) | 20 | 30 | — | — | — | — | — | — | — | — | — | — | — |
| (B2) | — | — | 30 | — | — | — | — | — | — | — | — | — | — |
| (B3) | — | — | — | 20 | 30 | — | — | — | — | — | — | — | — |
| (B4) | — | — | — | — | — | 30 | — | — | — | — | — | — | — |
| (B5) | — | — | — | — | — | — | 30 | — | — | — | — | — | — |
| (B6) | — | — | — | — | — | — | — | 30 | — | — | — | — | — |
| (B7) | — | — | — | — | — | — | — | — | 30 | — | — | — | — |
| (C) | — | — | — | — | — | — | — | — | — | 20 | 30 | — | — |
| (D) | — | — | — | — | — | — | — | — | — | — | — | 30 | — |
| Flow Mark | None | None | None | None | None | None | None | None | None | None | None | Yes | None |
| Transparency* and color | T | T | T | T | T | T | T | TL | T | T | T | OP | T |
| Total Transmittance (%) | 86.3 | 85.5 | 86.2 | 83.9 | 82.4 | 87.0 | 86.3 | 50.3 | 83.2 | 88.2 | 87.9 | 12.1 | 88.5 |
| Heat resistance (° C.) | 128.0 | 124.6 | 125.7 | 125.6 | 123.0 | 125.5 | 127.0 | 127.8 | 123.4 | 131.2 | 126.0 | 133.1 | 145.4 |
| Flame retardancy (3.2 mm) | V2 | V2 | V2 | V2 | V1 | V2 | V2 | V2 | V2 | Fail | Fail | Fail | V2 |
| BSP Width (μm) | 279 | 253 | 248 | 286 | 268 | 255 | 250 | 243 | 263 | 275 | 243 | 240 | 332 |

*T: Transparent, TL: Translucent, OP: Opaque

As shown in Table 1, when comparing the resin compositions of the present invention with resins including a polycarbonate and a conventional high molecular weight poly(methyl methacrylate) (weight average molecular weight 55,000 g/mol), the resin compositions of the present invention exhibit improved flame retardancy and scratch resistance (see Examples 1-9 and Comparative Examples 1-2). In addition, the resin compositions including the (meth)acrylic flame retardant copolymer of the present invention exhibit scratch resistance and flame retardancy of V2 or more, as compared with resins including a polycarbonate and an acrylic copolymer (see Examples 1-9 and Comparative Example 3). Specifically, the resin compositions of the present invention did not show any flow mark, and thus demonstrated improved compatibility and transparency.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polycarbonate resin composition comprising: (A) a polycarbonate resin; and (B) a (meth)acrylic flame retardant copolymer,
   wherein the (B) (meth)acrylic flame retardant copolymer comprises: (b1) a phosphorus-based (meth)acrylic monomer represented by Formula 1; (b2) an aromatic (meth)acrylate represented by Formula 2, a cycloaliphatic (meth)acrylate represented by Formula 3, or a combination thereof; and (b3) optionally a functional-group containing unsaturated monomer, wherein the (b3) functional-group containing unsaturated monomer comprises (meth)acrylic ester, unsaturated carboxylic acid, unsaturated carboxylic acid anhydride, acid anhydride, unsaturated carboxylic acid ester having hydroxyl groups, unsaturated carboxylic acid amide or a combination thereof:

[Formula 1]

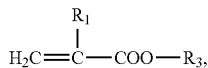

wherein $R_1$ is —H or —$(CH_2)_n$—$CH_3$, n is an integer from 0 to 5, and $R_3$ is

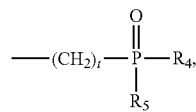

wherein t is an integer from 1 to 10, $R_4$ and $R_5$ are the same or different and are each independently —$O(CH_2)_qR$, q is an integer from 0 to 3, and R is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl;

[Formula 2]

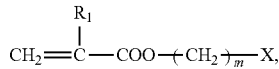

wherein $R_1$ is —H or —$(CH_2)n$—$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl;

[Formula 3]

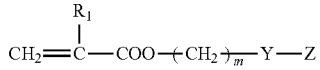

wherein $R_1$ is —H or —$(CH_2)n$—$CH_3$, n is an integer from 0 to 5, m is an integer from 0 to 10, Y is oxygen or sulfur, and Z is cyclohexyl, phenyl, methylphenyl, methylethylphenyl, methoxyphenyl, cyclohexylphenyl, chlorophenyl, bromophenyl, phenylphenyl or benzylphenyl.

2. The polycarbonate resin composition according to claim 1, wherein the (B) (meth)acrylic flame retardant copolymer comprises about 1 wt % to about 50 wt % of the (b1) phosphorus-based (meth)acrylic monomer, about 1 wt % to about 99 wt % of the (b2) aromatic (meth)acrylate and/or cycloaliphatic (meth)acrylate, and 0 wt % to about 98 wt % of the (b3) functional-group containing unsaturated monomer.

3. The polycarbonate resin composition according to claim 1, wherein the (B) (meth)acrylic flame retardant copolymer has a weight average molecular weight of about 5,000 g/mol to about 500,000 g/mol.

4. The polycarbonate resin composition according to claim 1, wherein the (B) (meth)acrylic flame retardant copolymer is present in an amount of about 1 part by weight to about 50 parts by weight based on about 100 parts by weight of the polycarbonate resin composition.

5. The polycarbonate resin composition according to claim 1, wherein the (A) polycarbonate resin is present in an amount of about 50 parts by weight to about 99 parts by weight based on about 100 parts by weight of the polycarbonate resin composition.

6. The polycarbonate resin composition according to claim 1, wherein the polycarbonate resin composition has a flame retardancy of V2 or more, as measured on a 3.2 mm thick specimen in accordance with UL94 vertical test method.

7. The polycarbonate resin composition according to claim 1, wherein the polycarbonate resin composition has a scratch resistance width from about 200 μm to about 340 μm, as measured on a 2.5 mm thick specimen in accordance with a Ball-type Scratch Profile (BSP) test.

8. The polycarbonate resin composition according to claim 1, wherein the polycarbonate resin composition further comprises at least one additive selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and mixtures thereof.

9. A molded article prepared from the polycarbonate resin composition according to claim 1.

* * * * *